United States Patent [19]

Rickards

[11] Patent Number: 5,101,165
[45] Date of Patent: Mar. 31, 1992

[54] ELECTRICAL CAPACITANCE CLEARANCEOMETER

[75] Inventor: Charles Rickards, Cincinnati, Ohio

[73] Assignee: General Electric Company, Cincinnati, Ohio

[21] Appl. No.: 530,059

[22] Filed: May 29, 1990

[51] Int. Cl.$^5$ .............................................. G01R 27/26
[52] U.S. Cl. .................................... 324/662; 324/681; 324/690
[58] Field of Search ................ 324/662, 686, 690, 688, 324/661, 671, 674, 681, 605

[56] References Cited

U.S. PATENT DOCUMENTS

| | | | |
|---|---|---|---|
| 2,842,738 | 7/1958 | Warnick | 324/61 |
| 3,593,127 | 7/1971 | Lucka | 324/662 |
| 3,826,980 | 7/1974 | Deichelmann et al. | 324/690 X |
| 4,063,167 | 12/1977 | Duly | 324/61 R |
| 4,329,644 | 5/1982 | Libertini et al. | 324/160 |
| 4,551,785 | 11/1985 | Kröner | 324/688 X |
| 4,568,873 | 2/1986 | Oyanagi et al. | 324/662 |
| 4,804,905 | 2/1989 | Ding et al. | 324/61 P |
| 4,806,848 | 2/1989 | Demers | 324/61 R |
| 4,813,273 | 3/1989 | Parsons | 73/118.1 |
| 4,818,948 | 4/1989 | Dooley | 324/61 P |
| 4,918,376 | 4/1990 | Poduje et al. | 324/690 X |

FOREIGN PATENT DOCUMENTS 2071852 9/1981 United Kingdom .

OTHER PUBLICATIONS

Electronics, p. 147, May 1953.

*Primary Examiner*—Kenneth A. Wieder
*Assistant Examiner*—Robert W. Mueller
*Attorney, Agent, or Firm*—Jerome C. Squillaro; Bernard E. Shay

[57] ABSTRACT

In a hot gas turbine engine a capacitive probe clearanceometer is employed to measure the clearance gap or distance between the continuous surface of a compressor or turbine wheel such as, for example, a shroud ring turbine and its confining casing under operating conditions. The probe positions a capacitor electrode at the inner surface of the casing adjacent the continuous surface path. Electrical power is supplied to the probe through an oscillator having a tuned circuit in which the probe is a component. A high frequency signal of the oscillator is amplitude modulated by changes in electrical capacitance between the probe capacitor electrode and the passing continuous surface. The modulated oscillator signal is processed to provide an electrical signal which is proportional to the distance between the casing and the continuous surface. A preferred combination of high temperature and contamination resistant metal and ceramic materials are combined in an improved gas tight braze sealed probe tip.

11 Claims, 3 Drawing Sheets

ELECTRICAL CAPACITANCE CLEARANCEOMETER

This invention relates to an electrical capacitance clearanceometer, and more particularly to an electrical capacitance measuring system particularly adapted to measure clearance between adjacent fixed and moving parts within a machine as a function of electrical capacitance changes between the parts.

BACKGROUND OF THE INVENTION

In various rotating machines, a rotor or rotating member is closely confined within a housing or casing, and it is important that the gap or distance between the casing and the rotating member, referred to as running clearance, be maintained within predetermined limits for safe and effective operation of the machine. One example of such a machine, and one to which this invention is particularly applicable, is a hot gas turbine engine such as an aircraft gas turbine engine. In such an engine, a turbine wheel or rotor having a circumferential row of spaced apart vanes or blades extending therefrom is closely confined within an encircling housing or casing to define a hot gas flow path transversely through the row of blades. Reaction of the blades to the hot gas flow causes rotation of the turbine wheel and appropriate power generation.

In such hot gas turbine engines, the loss of turbine blade reaction from hot gas leakage or bypass through the running clearance space, instead of between turbine blades represents a potential power loss. However, preservation of a minimum clearance gap during engine operation is a necessary precautionary measure to avoid significant rotational contact of the blades with the encircling casing which may lead to failure of engine components as well as the engine as an effective power plant. For these reasons it has become a practice to measure the running clearance of a turbine wheel during its operation and to have a continuous measuring or monitoring system for the running clearance during certain predetermined operations of the turbine. Various operating characteristics of a hot gas turbine engine provide significant difficulties to the use of many known gap and distance measuring devices, particularly those requiring actual contact with a moving member. For example, the environment at the high speed turbine blades is hostile to measuring devices, reaching extreme temperatures in the range of 1200° F. to 1800° F. in the presence of a high temperature corrosive gas stream. This extreme temperature range causes significant differential expansion of various component parts which affects not only any associated measuring means, but also the running clearance gap or distance being measured. Accordingly, measuring devices or systems requiring contact with the rotor or blades have been avoided. With respect to non-contact measuring means, various electrical capacitance systems have been developed to measure the running clearance of hot gas turbine wheels and compressor rotors.

In these prior electrical capacitance systems, a probe member with a sensor end thereon is installed in an appropriate aperture in a rotor housing, for example, so that the sensor end of the probe is exposed to the tips of the turbine blades. The sensor end of the probe adjacent the moving blades is fitted with an electrical capacitor electrode which may be positioned closely adjacent to or at the inner surface of the closely confining casing or housing around the turbine wheel. In this position the probe electrode represents one side of the running clearance gap and the tip surface of each passing turbine blade, at electrical ground potential is gainfully employed as an opposite capacitor electrode, and the other side of the running clearance gap. A change in the clearance gap is a change in the distance between capacitor electrodes and a change in electrical capacitance therebetween. Capacitance changes between the probe electrode and the passing blade tips are utilized to modulate an electrical oscillator signal and the modulated signal is processed to provide a further electrical signal indicative of the running clearance gap. In some gas turbine wheels the turbine blades in the circumferential row on the wheel have oppositely projecting shelf like segments at their free ends which meet or interfit with similar segments of an adjacent blade in the row to form a continuous circumferential rim or band surface encircling the blades and rotating therewith. Such a turbine wheel with an integral band or separately fitted band is referred to as a shroud ring turbine, and the shroud presents a continuous surface passing the probe as opposed to an unshrouded turbine wheel with blades having upstanding free ends which presents what may be described as an interrupted surface passing the probe electrode. A particularly advantageous clearanceometer will have the capability to sense variation in the running clearance between the continuous surface of a shroud ring and the encircling casing. Such a clearanceometer finds extended applicability to various other rotor members having continuous surfaces such as a sidewall or rim of a centrifugal compressor impeller.

As previously described, the probe member, and particularly the sensor electrode part thereof, is positioned in a very hostile environment of high temperatures in the presence of contaminating hot combustion gases from the combustion system of the engine, conditions which contribute to early probe deterioration resulting in, for example, a decrease in sensitivity and accuracy. As a consequence of the above noted factors, continuing efforts are expended to provide electrical capacitance probes which are more highly resistant to temperature extremes and contamination, and which not only have increased sensitivity, accuracy and stability but also wider applicability including sensitivity to continuous surfaces.

OBJECTS OF THE INVENTION

It is an object of this invention to provide an improved high temperature and contamination resistant electrical capacitance clearanceometer particularly adaptable for use with continuous surfaces.

It is another object of this invention to provide an improved high sensitivity and electrically stable capacitance probe and electrical circuit therefor for use in an electrical capacitance measuring clearanceometer system.

It is a further object of this invention to provide an improved electrical capacitance clearanceometer probe which utilizes a gas tight braze sealed sensor unit to prevent egress therein of contaminants, and a structure which is particularly adaptable for measuring running clearance with respect to a continuous surface of a moving member passing the probe.

SUMMARY OF THE INVENTION

An improved capacitance type probe member and electrical circuit therefor is disclosed which is particularly adapted to be inserted in the casing of an aircraft gas turbine engine with a sensor end thereof being closely adjacent the running clearance gap of a turbine wheel. The sensor end of the probe includes a metal and ceramic composite structure with a particular capacitor electrode braze joined to the ceramic and comprises a braze sealed combination of materials found to be of superior gas turbine heat and corrosion resistant characteristics together with temperature characteristics complementarily matched to each other. A low capacitance low noise triaxial electrical cable passing into the probe is utilized to electrically interconnect the sensor electrode and an electrical capacitance measuring system circuit and to electrically integrate the probe components with the circuit. The overall combination provides a highly accurate and stable electrical sensing element and associated electrical capacitance measuring system particularly adapted for use with continuous surfaces. A high frequency electrical oscillator is connected to the probe sensor electrode and its electrical signal is amplitude modulated by the capacitance reactance between the probe electrode, which is electrically energized from the oscillator and appropriate electrical power supply, and an opposite spaced surface of a turbine wheel, such as a shroud ring at electrical ground potential. The modulated oscillator signal is passed through an appropriate electrical circuit to provide a DC voltage which is proportional to the distance between the probe electrode and an adjacent turbine wheel periphery or surface.

This invention will be better understood when taken in connection with the following drawings and description.

DESCRIPTION OF A PREFERRED EMBODIMENT OF THIS INVENTION

Figure 1:
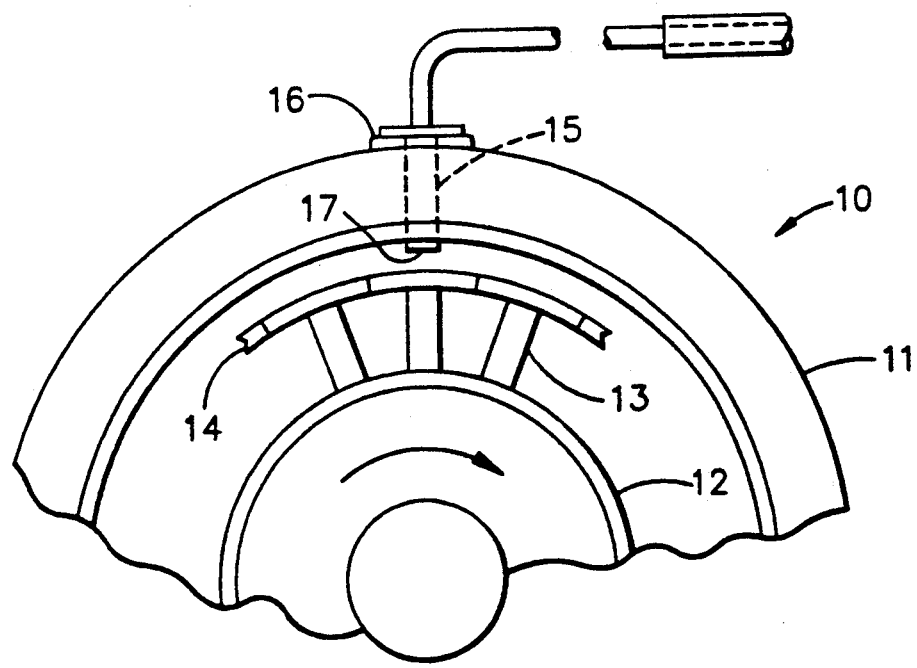
FIG. 1 is a schematic illustration of a capacitance probe mounted in a turbine housing.

A schematic illustration of one capacitance probe mounting application with a probe in its operative position is shown in FIG. 1.

Referring now to FIG. 1, a hot gas turbine engine 10 comprises a housing or casing 11 closely encircling a bladed turbine wheel 12 which is adapted for rotation in housing 11 by reaction with a hot gas stream which flows axially through the row of blades 13. It is important that the running clearance or gap between the blade tips or free ends and the inner surface of the housing 11 be maintained in a proscribed range. Where the turbine wheel utilizes a shroud ring represented generally as 14 which interfits between blade ends or bands the blades at their free ends to define a continuous surface, it is equally important that the clearance gap between the shroud ring and the housing be maintained in a proscribed range. The probe of this invention is positioned closely adjacent the turbine wheel and utilized to cooperate with the passing surface by means of electrical capacitance therebetween to modulate an electrical oscillator signal which is processed in an electrical circuit to provide a final electrical signal which is proportional to the running clearance or gap between a surface section of a shroud and the encircling housing. In FIG. 1, probe 15, shown in phantom, is inserted into casing 11 through an appropriate apertured casing mounting pad or pedestal 16. The inner end of probe 15 is fitted with an electrical capacitor probe electrode 17 at the inner surface of casing 11. The combination of shroud ring 14 with probe electrode 17, defines a pair of capacitor electrodes in spaced planar relationship separated by an air gap which is the running clearance gap of the turbine wheel with respect to casing 11. The probe of this invention embodies a structure particularly adaptable to serve as an electrical capacitance sensor for the running clearance gap with a continuous surface. A preferred assembly for probe 15 is illustrated in FIG. 2.

Figure 2:
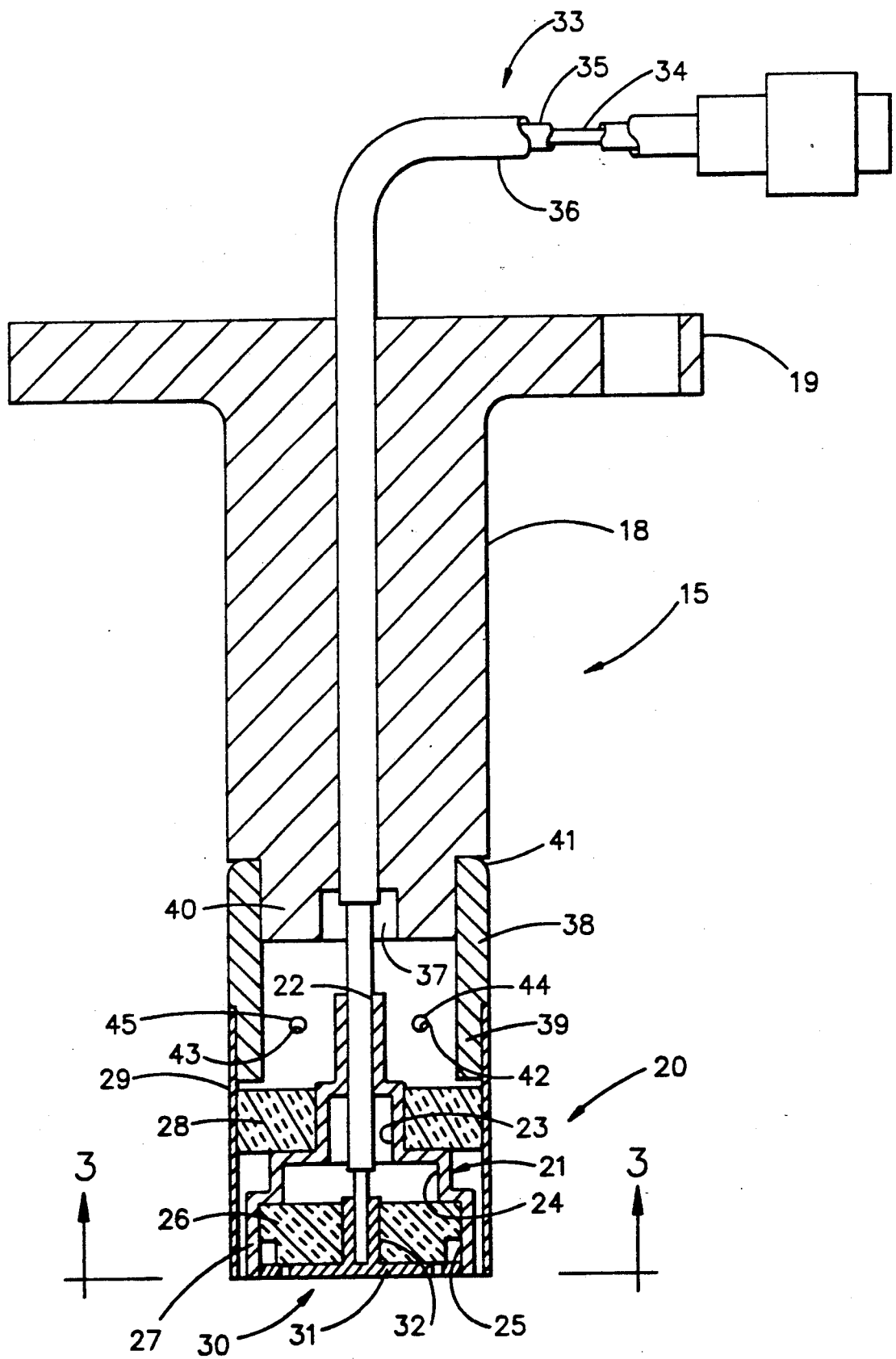
FIG. 2 is a cross-sectional illustration of an improved probe of this invention for the application in FIG. 1.

Referring now to FIG. 2, probe 15 comprises a cylindrical body 18 with a concentric mounting disc flange 19 at one end and a braze sealed sensor tip assembly 20 at the opposite end. An important component of sensor tip 20 is a thin wall, flare mouth, sensor housing member 21 having a generally inverted open ended cone or funnel shape with a central bore 22, and a series of concentric successively larger counterbore shape recesses 23, 24 and 25. A thick disc or washer 26 of an electrically insulating and temperature resistant material such as alumina, $Al_2O_3$ is fitted concentrically into the mouth end or counterbore recess 25 of housing member 21 to engage rim 27 of housing 21. A further thick annular $Al_2O_3$ washer 28 is positioned concentrically on funnel housing 21 to surround counterbore recess 23 and rest on the shoulder between counterbore recesses 23 and 24. A hollow thin wall transition metal sleeve 29 of a platinum alloy fits concentrically around sensor housing 21 with its inner wall surface in abutting relationship with the periphery of washer 28. Washer 26 which fits in the mouth 25 of the sensor housing 21 and occupies the exposed end of sealed sensor tip assembly 20, is adapted to support a sensor strip electrode unit 30. Unit 30 of FIG. 2 includes a thin narrow generally rectangular planar electrode strip 31 (more clearly shown in FIG. 3) in planar abutting and concentric relationship with washer 26 and an integral hollow stem member 32 projecting through washer 26 into counterbore recess 24.

Funnel housing member 21 is a major component of sensor tip 20 and surrounds washer 26 while supporting washer 28 thereon. Washer 26 is carried by housing 21 while supporting washer 28 thereon. Washer 26 is carried by housing 21 so that one of its opposite transverse planar surfaces has strip electrode 31 brazed thereto in planar abutting relationship for a large area high strength bond, and to position strip electrode 31 in planar spaced relationship to the opposite capacitor electrode of the moving member or rotor. Sensor housing member 21 may be generally described as an opposite open ended conical, flare, or bell housing with a small open end in which an electrical cable casing 35 is confined, and a large flared and rimmed open end 25 in which an electrically insulating annulus or washer 26 is peripherally retained in concentric relationship. Washers 26 and 28 are produced from alumina, $Al_2O_3$ which is very high temperature resistant and readily amenable to metallization bonding to the adjacent noted transition metal surfaces of sleeve 29 and housing 21. Sensor housing 21 is metallize braze sealed to washers 26 and 28 and is the principal carrier for a sensor end structure assembly which comprises sensor housing 21, washers 26 and 28, sleeve 29, and the capacitor electrode unit 30.

Washer 26 in the mouth of funnel housing 21 carries capacitor electrode strip 31 to be next adjacent to and exposed to, a turbine wheel periphery. An electrical signal is passed into probe 15 by means of a triaxial cable 33 which passes concentrically into probe body 18. Cable 33 comprises a central conductor 34 and spaced electrically conductive inner and outer metal sheaths 35 and 36. Cable 33 passes concentrically through probe body 18 with outer sheath 36 making electrical contact with probe body 18 until it reaches central recess 37 at the end of body 18 where outer sheath 36 terminates. Inner sheath 35 with central conductor 34 therein continues and passes into bore 22 of housing 21, with inner sheath 35 making electrical contact with bore 22 of housing 21, and into recess 23 at the end of which, sheath 35 terminates. Central conductor 34 continues and enters hollow stem 32 of electrode unit 30 and is brazed therein for electrical connection to sensor electrode 31. Sheath metal for inner and outer sheaths 35 and 36 as well as for probe body 18 comprise a high temperature resistant alloy referred to as Inconel alloy, an alloy containing principally iron, nickel, and chromium. Intervening spaces in cable 33 are filled with an electrical insulating mineral material with a high dielectric constant (DK), such as $SiO_2$, with terminating ends sealed to prevent the entrance of contaminating gases. Outer sheath 36 is electrically connected to probe body 18 while inner sheath 35 is electrically connected to sensor housing member 21. Sensor housing 21 is electrically insulated from sleeve 29 and probe body 18 by MgO washer 28. Sensor tip 20 of this invention utilizes a gas tight metallize braze seal between component parts to prevent egress into the probe of fuel and hot gases from the combustion gas stream passing the probe. These contaminants may deleteriously affect electrical insulation resistance between conductors and render the system inoperative. In one preferred assembly insulators such as washers 26 and 28 (FIG. 2) were $Al_2O_3$ and were metallized by the well known molybdenum manganese process and then nickel, Ni, plated to provide a good brazing surface. Subsequently sensor tip 20 (FIG. 2) including sleeve 29 sensor housing 21, washers 26 and 28, electrode unit 30, and shield 46 (FIG. 3) were assembled and vacuum brazed as a sensor unit assembly comprising a gas tight metallized brazed combination of temperature matched components such as a platinum alloy for housing 21, sleeve 29 and electrode unit 30, and $Al_2O_3$ for washers 26 and 28. The use of braze sealing negates the use of mechanical joints more prone to the passage of gas therethrough. More importantly each pair of abutting surfaces which ordinarily may become a gas leak site is braze bonded and accordingly the sensor unit is a gas tight braze sealed unit with temperature matched or complementary components. Also, electrode unit 30 including electrode strip 31 are braze joined to washer 26 and accordingly, mechanical joints are, for major components in tip 20, avoided.

Probe tip 20 is conveniently assembled to probe body 18 through the use of an adapter cylinder or sleeve 38 of a metal similar to that of probe body 18. Adapter cylinder 38 comprises a necked down or O.D. reduced section 39 which slides concentrically into sleeve 29, and body 18 includes a necked down or reduced section 40 which slides concentrically into adapter cylinder 38. A chamfer edge 41 on sleeve 38 abuts a shoulder on probe body 18 and provides a convenient welding groove to join tip 20 to body 18.

As a reserve safety measure, sleeve 29 together with its internal components is mechanically joined to adapter sleeve 38 by pin locking means which comprises a pair of apertures 42 and 43 which pass through the overlap parts of adapter cylinder 38 and sleeve 29, across the open space between the end of body 18 and $Al_2O_3$ washer 28 and again through the overlap of cylinder 38 and sleeve 29. Small metal rods or pins 44 and 45 are passed through the apertures with the ends thereof flush with the external surface of sleeve 29. Pins 44 and 45 prevent axial separation of probe tip 20 in the event of braze failure.

The combination of $Al_2O_3$ and platinum alloy abutting surfaces provides excellent brazing and temperature matching characteristics for the noted hostile turbine environment. Sensor tip 20 also includes a protective shield for the sensor electrode 31 as shown in FIG. 3.

Figure 3:
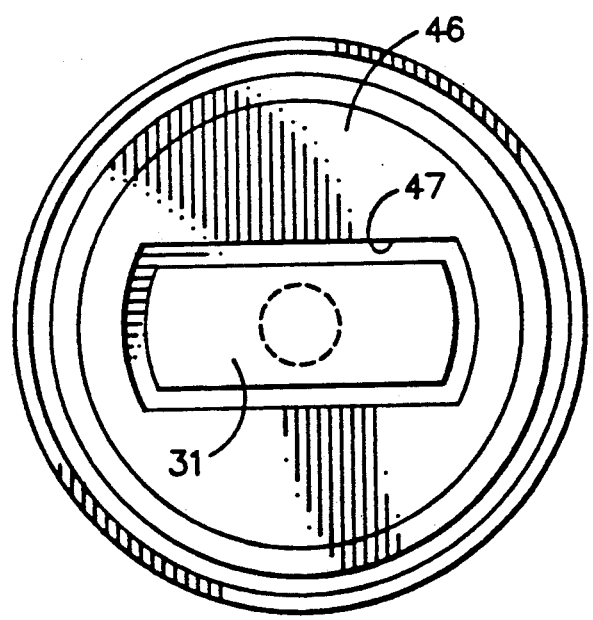
FIG. 3 is an end view of a preferred probe sensor tip of FIG. 2 taken along the line 3—3 of FIG. 2.

Referring now to FIG. 3 which is an end view of tip 20 of FIG. 2 showing electrode 31 as presented to a turbine wheel periphery, a thin disc or shield 46 of preferably a platinum alloy contains a cutout or slot portion 47 of the same general shape as electrode strip 31 but peripherally larger. Shield 46 is placed on the transverse planar end of insulator 26, FIG. 3, with its cutout section 47 in surrounding but spaced relationship to electrode strip 31. However, the periphery of shield 46 fits concentrically within rim 27 of funnel housing 21 to which it has been carefully laser welded.

A narrow generally rectangular strip electrode is preferred for the sensor of this invention as compared to, for example, a circular disc electrode. The use of a strip electrode as described, with appropriate orientation with respect to a passing surface will permit some expected axial movement of the turbine wheel without deleteriously affecting the electrical function of the probe. For example, the primary purpose of the probe is to function with respect to radial clearance changes of the shrouded wheel and to do so while being insensitive to some expected small axial movement of the wheel.

Various electrical circuits may be provided for probe 15 of this invention. In general such a circuit comprises a source of constant AC electrical power and an oscillator. As illustrated in FIGS. 1 and 2, when electrical power is supplied to electrode 17, and shroud 14 is at electrical ground potential, an electrical capacitor structure is defined by probe electrode 17 being one electrode surface of a pair of opposed electrodes of a capacitor, and shroud 14 passing adjacent probe electrode 17 being the opposite and other electrode surface of the capacitor.

The electrical capacitance of the defined capacitor structure is proportional to the distance between the opposed electrode surfaces, e.g. the running clearance as described. Electrical capacitance is determined by having probe electrode 31 be in a tuned circuit of the oscillator. Since the surface area of the shroud passing the probe is essentially constant and the probe electrode has a fixed surface, the capacitance therebetween remains near constant for a given tip clearance. However, during engine operation at very high temperatures a turbine wheel is exposed to significant differential thermal expansion and centrifugal forces which will cause tip clearance changes as well as cause the periphery of the turbine wheel to be altered from a true circle. Further, bearing wear may cause some slight orbiting of the turbine wheel. Either described condition may change the running clearance gap albeit only once for each revolution of the wheel, a condition referred to as once per rev. phenomena. Each gap change results in a capacitance change between electrode 31 and the blade tips or shroud ring, and the capacitance changes are utilized to amplitude modulate an oscillator signal which is then rectified and filtered to produce a D.C. signal proportional to the running clearance gap. Such a signal may be gainfully employed as a readout signal for an operator or as initiating means for a control system effective to change the running clearance. In a frequency modulated capacitance clearance measuring system for measuring running clearance with an interrupted surface such as exposed blade tips at the periphery of a gas turbine rotor the frequency response of the system, may be in the range of 100 KHZ to 1 MHZ. Since the clearance between a shroud ring as compared to the rate of change with an exposed blade tip periphery, a measuring system with a lower frequency is satisfactorily utilized. In one example of this invention the system had a frequency response range of 0 to 200 HZ and utilized a 1 MHZ oscillator to provide a 16 KHZ AC voltage which is passed through a synchronous detector to provide a DC voltage proportional to the running clearance gap.

Figure 4:
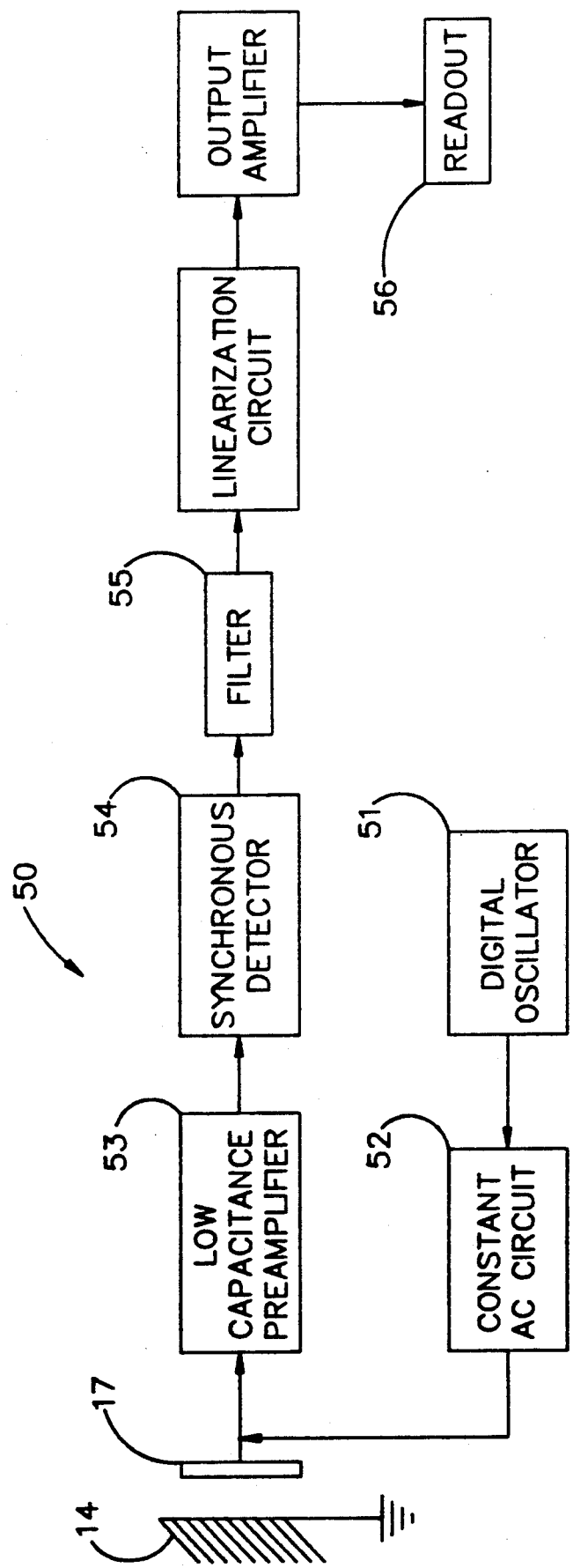
FIG. 4 is an electrical block diagram of an electrical circuit for the probe of FIG. 2.

One example of a satisfactory electrical circuit for this invention is shown as a block diagram in FIG. 4.

Referring now to FIG. 4, electrical circuit 50 is connected to a probe electrode 17 of FIG. 1 or 31 of FIGS. 2 and 3. Electrode 17 is spaced from a turbine wheel surface 14 such as a shroud ring 14 (FIG. 1) as described.

A 1.0 MHZ digital oscillator 51 and current source 52 provides a 16 KHZ AC electrical signal through a transformer to probe electrode 17 and the capacitance changes as described modulate the amplitude of the oscillator output signal. This signal is amplified by amplifier 53 and passed to a synchronous detector 54 to rectify the signal prior to passing through filter 55 to produce a DC voltage signal as an indication of running clearance. The signal from filter 55 may be passed to an appropriate audio or visual signal means 56 and/or utilized to energize a running gap corrective system.

This invention provides a much improved capacitance clearanceometer system particularly for continuous surfaces, combining the advantages of a capacitance probe sensor with a gas tight braze sealed combination of high temperature matched components integrated with a capacitance change amplitude modulated oscillator in a running clearance measuring circuit.

While this invention has been disclosed and described with respect to a preferred embodiment thereof, it will be understood by those skilled in the art that various changes and modifications may be made therein without departing from the spirit and scope of the invention as set forth in the following claims

What is claimed is:

1. In an electrical capacitance measuring system for measuring the clearance between a casing and a moving member within and closely adjacent said casing, an improved capacitance probe and electrical circuit therefore comprising in combination:
    (a) a narrow cylindrical probe body adapted for insertion into said casing to have an end thereof adjacent said moving member,
    (b) a sensor tip assembly on the end of said probe adjacent said moving member, said sensor tip comprising:
        an electrically conductive housing including a plurality of concentric sections and an open ended flare mouth shape member,
        an electrically insulating metal oxide disc member positioned concentrically in said flare mouth of said sensor housing member with a transverse planar surface arranged to be exposed to said moving member in planar spaced relationship,
        a planar generally rectangular electrical capacitor electrode strip braze bonded to said transverse planar surface of said metal oxide member in planar abutting relationship and electrically insulated from said housing member,
        and an electrical cable passing concentrically into said probe and electrically connected to said probe and to said capacitor electrode to interconnect said capacitor electrode with an electrical capacitance measuring circuit, said circuit including an amplitude modulated oscillator wherein changes in distance between said capacitor strip electrode and said moving member cause amplitude modulation of an output signal of said oscillator.

2. The invention as recited in claim 1 wherein said electrical cable is a triaxial cable comprising a center conductor and spaced inner and outer surrounding metal sheaths with said outer sheath electrically connected to said probe body, said inner sheath electrically connected to said sensor housing member, said inner conductor electrically connected to said capacitor electrode strip, and the intervening spaces in said triaxial cable filled with $SiO_2$ electrical insulation.

3. The invention as recited in claim 1 wherein a synchronous detector is connected to said oscillator to process said amplitude modulated signal from said oscillator and provide an electrical signal proportional to the distance between said capacitor electrode and said moving member.

4. The invention as recited in claim 1 wherein said sensor housing and said braze bonded electrical capacitor electrode comprise a platinum alloy and said metal oxide member is $Al_2O_3$.

5. The invention as recited in claim 1 wherein an annular metal oxide insulator encircles said housing and is braze bonded thereto.

6. The invention as recited in claim 5 wherein a transition metal cylinder surrounds and is braze bonded to said annular insulator to retain said annular insulator together with said sensor housing member and said electrically insulating metal oxide disc member therein in combined assembled gas tight relationship as a sensor tip for said probe.

7. The invention as recited in claim 5 wherein an adapter sleeve is concentrically joined to said narrow cylindrical probe and said transition cylinder is concentrically joined to said adapter cylinder.

8. The invention as recited in claim 7 wherein said probe and said adapter sleeve comprise an iron, nickel and chromium alloy and said transition cylinder comprises a platinum alloy.

9. The invention as recited in claim 7 wherein said probe body fits concentrically in said adapter sleeve in overlap relationship and said adapter sleeve fits concentrically into said transition cylinder in overlap relationship.

10. The invention as recited in claim 9 wherein pin members are inserted transversely through the said overlap of said adapter sleeve and said transition cylinder to prevent axial separation thereof.

11. The invention as recited in claim 1 wherein said planar capacitor electrode comprises a narrow rectangular strip.

* * * * *